UNITED STATES PATENT OFFICE.

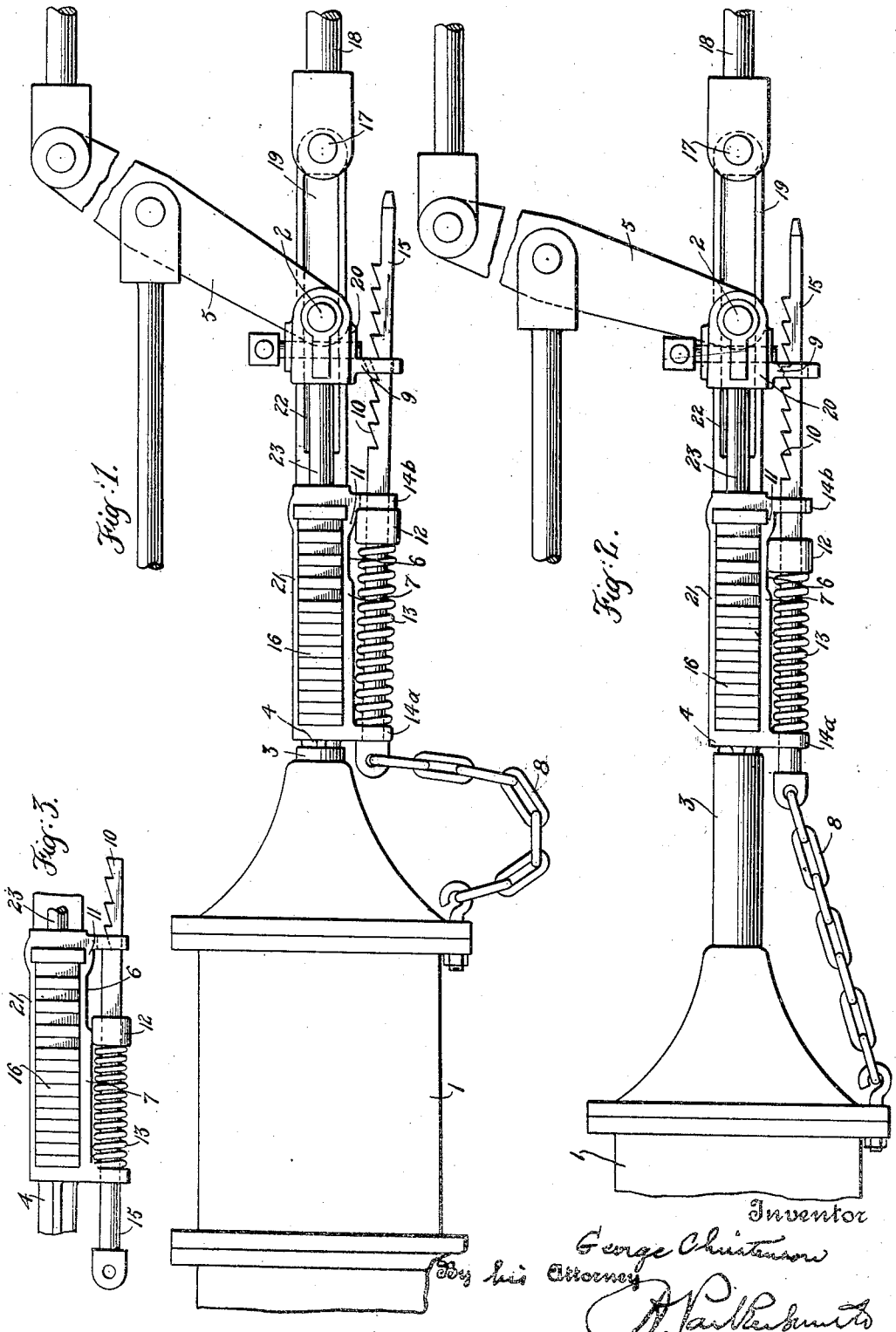

GEORGE CHRISTENSON, OF JAMAICA, NEW YORK, ASSIGNOR TO H. W. JOHNS-MANVILLE COMPANY, A CORPORATION OF NEW YORK.

AUTOMATIC SLACK-ADJUSTER FOR BRAKE SYSTEMS.

1,251,643.

Specification of Letters Patent.

Patented Jan. 1, 1918.

Application filed January 4, 1917. Serial No. 140,608.

*To all whom it may concern:*

Be it known that I, GEORGE CHRISTENSON, a citizen of the United States of America, residing at Jamaica, county of Queens, State of New York, have invented certain new and useful Improvements in Automatic Slack-Adjusters for Brake Systems, of which the following is a specification.

My invention relates to automatic slack adjusters for vehicle brakes and comprises an improvement on that type of such apparatus in which the take-up or slack adjusting operation is brought about by successively dropping a series of shims behind a movable plunger forming an adjustable link in the brake rigging, said shims so brought into action serving as an automatically adjustable abutment for said plunger.

The principal difficulty with automatic slack adjusters of this type as heretofore designed and operated has been their liability in emergency applications to overrun the desired extent of action, and take up more slack than the excess over the normal amount of slack, thereby depriving the brake shoes of the necessary clearance from the wheel peripheries and causing the brakes to drag on the wheels even after the brake piston is in full release position. This abnormal action results from the elasticity of the brake rigging and its consequent tendency to yield under the stress of an emergency application. In these shim slack adjusters the well known principle of operation is the temporary holding of the plunger element in the extreme position assumed on any brake application in which excess piston travel occurs while the piston and shim carrying element are moving back to the positions corresponding to normal piston travel, with the expected result that a predetermined number of shims shall drop down behind the plunger, and the effective length of the brake rigging be thereby increased by an amount just sufficient to take up the excess brake shoe clearance which has previously been created by wearing down of the brake shoe faces. This would always be the case in a well designed apparatus if the brake rigging (levers, rods and brake beams) were all rigid. As these are all more or less elastic, however, the operation of the system sometimes works out in another way. The take-up mechanism is usually designed to drop one shim at each operation. Starting with the standard amount of piston travel on a full application of the brakes, ordinary wear begins to increase the clearance and slack so that excess piston travel gradually increases, but for some time it does not reach an extent sufficient to cause the automatic take-up to operate. That is to say the play of the parts under service applications is not yet equal to the thickness of one shim, and so no take-up occurs. But if, when the clearance is nearly sufficient to cause a take-up action under a service application, an emergency application is made the brake rigging yields so much further under the unusual stress that the take-up mechanism overruns and drops two or more shims instead of one. Consequently the piston travel on succeeding service applications is cut down to six or seven inches instead of being cut down to the desired eight inches, if that is the predetermined standard, and even on full release the brake shoes do not clear the wheels, on account of the expansion and drag, elasticity and loose connections of the brake rigging.

My invention overcomes this difficulty by limiting the take-up action to the dropping of only a predetermined number of shims, usually one, no matter how great the excess of piston travel may be on the particular brake application which brings the take-up into operation. I have here shown my invention as applied to the particular form of shim take-up described in my pending application Serial No. 110,802, filed July 22, 1916, as it is particularly adapted to that form, but the principle of operation is also applicable to other forms of shim take-up by simple modifications which will be obvious to those skilled in the art. The best form of apparatus at present known to me as embodying the principle of my invention is illustrated in the accompanying sheet of drawings in which, Figure 1 is a plan view of a portion of a standard freight brake rigging with my invention applied and the parts in release position.

Fig. 2 shows the same in the position assumed during a service application when the take-up is in action.

Fig. 3 is a detail showing the position assumed by certain of the parts during an emergency application whereby the take-up is temporarily disabled and prevented from excess action.

Throughout the drawings like reference characters indicate like parts. 1 is the compressed air cylinder, having a piston (not shown) with hollow piston rod 3, in which is loosely mounted the push rod structure 4, which is pivoted at 2, to the floating lever 5, of the main brake rigging. The adjustable take-up mechanism comprises an adjustable, extensible form of the general push rod structure which consists of the slotted shim carrying frame 21, in which slides the plunger 23, which ends in a cross head 20, having ears at its outer end forming a clevis connection with floating lever 5, by means of pivot pin 2. The frame 21, is again slotted at 22, to form guides for the cross head 20, of plunger 23, and has a further extension 19, to which the hand brake rod 18, is connected at 17. In frame 21, are mounted the shims 16, and the operation of these elements is as described in my prior application Serial No. 110,802 the shims dropping down behind the plunger 23, to build up a lengthening abutment for the plunger as it is intermittently pulled out, step by step, to lengthen the push rod structure as a whole and so reduce excess piston travel which would otherwise result as the brake shoes wear down.

This step-by-step pushing out of plunger 23, is also produced in the manner described in my prior application by ratchet rod 15, mounted on and parallel to the push rod structure 4, and movable longitudinally thereof in housings $14_a$, $14_b$. The ratchet rod is normally held in position shown in Fig. 1, by spring 13, confined between the inner housing $14_a$, and the collar 12, on the shank of the ratchet rod. In such position collar 12, rides on rib or cam 11, being forced up against housing $14_b$. In that position the ratchet teeth 10, on rod 15, are held out of engagement with projection 9, on cross head 20, of plunger 23. Chain 8, is connected to the inner end of ratchet rod 15, and to any fixed point such as cylinder 1. The construction and operation of these parts are such that chain 8, has slack enough to permit movement of ratchet rod 15, with the piston and push rod up to normal piston travel only. Upon excess piston travel occurring ratchet rod 15, is held stationary by chain 8, while the push rod structure 4, moves on, compressing spring 13, and putting chain 8, under a tension which tends to pull the inner end of the ratchet rod away from the push rod structure and swing teeth 10, into engagement with projection 9, on plunger 23. This engagement is rendered possible by lateral play of rod 15, in outer housing $14_b$, whenever collar 12, runs off of rib or cam 11. During this relative movement of plunger 23, and ratchet rod, projection 9, slips over one or more teeth 10, and, on release of the brakes, consequent return of the piston and push rod and expansion of spring 13, plunger 23 is pushed out until the ratchet teeth are disengaged by collar 12, again riding up on rib or cam 11. As plunger 23, moves out the distance of one tooth an additional shim drops behind it and holds it in its new position.

This action might overrun in the manner hereinbefore explained and drop more shims than is intended, thus reducing brake shoe clearance below standard. To prevent this my present invention provides an extension rib or second cam 7, upon which collar 12, rides again, as shown in Fig. 3, if there is more than the normal excess of piston travel, i. e. more than enough to carry projection 9, past two or more of ratchet teeth 10. The riding of collar 12, on extension rib or cam 7, pulls teeth 10, out of engagement with projection 9, and disables the take-up during such excess piston travel. On release of brakes, collar 12, dips down into depression 6, between sections 7 and 11, as spring 13, expands and drives ratchet rod 15, outward, and allows the ratchet teeth 10, to engage projection 9, just long enough to push plunger 23, out a distance slightly in excess of the thickness of one shim, but less than the thickness of two shims. This depression 6, has a length equal to the width of collar 12, plus the thickness of about a shim and a half. Consequently the period of engagement of ratchet teeth with projection 9, as illustrated in Fig. 2, can never continue long enough to pull plunger 23, out far enough to drop more than one shim.

The advantages of my invention comprise its positive and uniform action under all conditions of operation whereby the dropping of only one shim or of some other predetermined maximum number of shims, is assured no matter how heavy the brake application and how great the bending or stretching of the brake rigging may be under any such heavy brake application, and the resulting maintenance of a standard minimum brake shoe clearance.

Having described my invention, I claim:

1. In an automatic slack adjuster for power brakes the combination with the usual cylinder, piston and brake rigging, of an adjustable member included in said rigging, comprising a series of shims and a plunger coöperating therewith, and means for automatically moving said plunger away from the shims just far enough on any movement of the piston beyond a predetermined limit to permit only a predetermined number of shims to drop behind the plunger, said means comprising a projection on the plunger, a ratchet rod movable relative to the plunger and having teeth adapted to engage said projection, and mechanism permitting an engagement of said projection by said teeth during any such relative movement just long enough to move the plunger away from the shim a distance equal to the thickness of the predetermined number of shims.

2. In an automatic slack adjuster for fluid pressure brakes having a series of vertically movable shims carried by the piston rod and a plunger pivoted to the floating lever, mounted on the piston rod and abutting against said shims, the combination with said piston rod and plunger of a ratchet bar mounted and movable on the piston rod in a direction parallel to the plunger and adapted to engage a projection on the plunger, a spring forcing said teeth toward engagement with said projection, a rib on the piston rod having a depression therein, a collar on said ratchet rod engaging said rib under pressure from said spring, and means for moving said ratchet rod relative to the piston rod on the occurrence of excess piston travel so that the collar will move along the rib and be forced by the spring into the depression therein and thereby permit the ratchet teeth to engage the projection on the plunger, the length of the depression being such that the possible travel of the ratchet rod collar therein will slightly exceed the thickness of one shim.

GEORGE CHRISTENSON.

Copies of this patent may be obtained for five cents each, by addressing the "Commissioner of Patents, Washington, D. C."